J. JONES & H. S. BOHM.
TREATMENT OF GOLD BEARING ANTIMONY ORES.
APPLICATION FILED MAY 18, 1910.
984,090.
Patented Feb. 14, 1911.
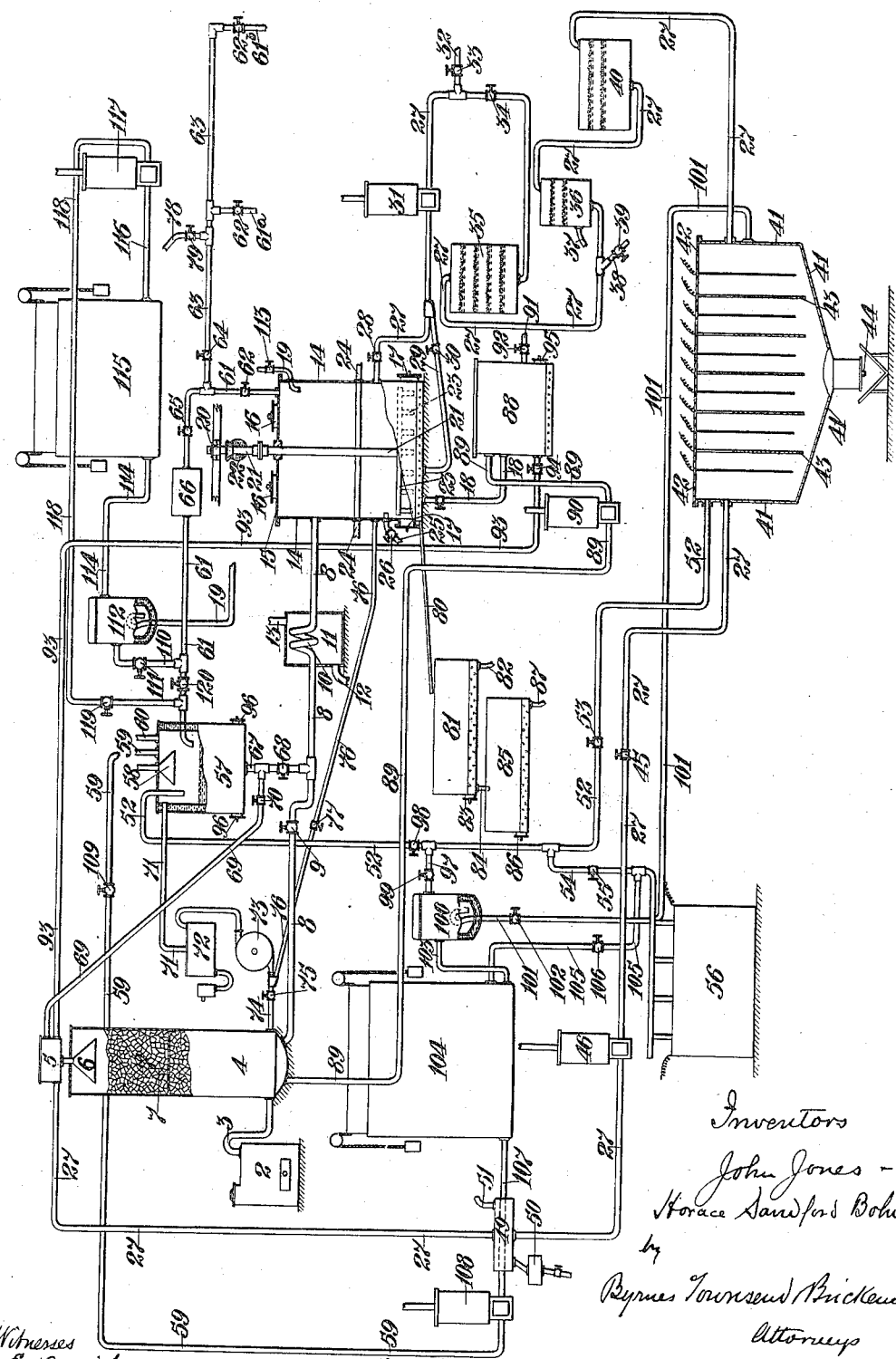

UNITED STATES PATENT OFFICE.

JOHN JONES AND HORACE SANDFORD BOHM, OF SHANDON HILL, MOUNT MORGAN, QUEENSLAND, AUSTRALIA.

TREATMENT OF GOLD-BEARING ANTIMONY ORES.

984,090. Specification of Letters Patent. Patented Feb. 14, 1911.

Application filed May 18, 1910. Serial No. 562,088.

*To all whom it may concern:*

Be it known that we, JOHN JONES and HORACE SANDFORD BOHM, subjects of the King of Great Britain and Ireland, residing at Shandon Hill, a suburb of the town of Mount Morgan, in the county of Raglan, in the District of Port Curtis, in the State of Queensland, Commonwealth of Australia, have invented certain new and useful Improvements Relating to the Treatment of Gold-Bearing Antimony Ores, of which the following is a specification.

This invention relates to an improved method of treatment of gold bearing antimony ores, which method in its practical operation on a commercial scale, can be carried on with peculiar economy in a complete and efficient manner, not only to recover the sulfur, antimony, and precious metals from the ore, but also, to generate and regenerate the chemical solutions used and continuously apply them to the ore treatment.

In carrying out this invention a hydrochloric generator (H.Cl) and a tower are provided in communication, the acid being conducted from the tower through an auxiliary heating chamber to a dissolving vat wherein it is agitated and further heated with the pulverized ore. From the vat the surcharged liquor is passed through filters and a trap (in which any hydrogen sulfid ($H_2S$) held by the solution is decomposed) to an electrical deposition tank in which the antimony is deposited. From the tank the solution is conveyed to a trap, in which any dissolved chlorin (Cl) is formed into hydrochloric (H.Cl) and sulfur precipitated. The solution is then passed to the top of the tower, where it is strengthened and reused. Sulfureted hydrogen gas ($H_2S$), generated in the dissolving vat, is conveyed, through a strainer, to a regenerator there mixing with chlorin gas liberated from the solution in the deposition tank, the gases upon being condensed forming hydro-chloric (H.Cl) acid and free sulfur. Chlorin is also admitted from an extraneous source and the gases conveyed either directly or indirectly to the regenerator in proper chemical proportion. The aqueous acid within the regenerator may be conveyed, through the auxiliary heating chamber, direct to the dissolving vat, or, it may be led to the tower to be strengthened before re-use. The hydro-chloric (H.Cl) gas or vapor within the regenerator, is passed through a trap, wherein it is freed of any precipitated sulfur, and from which, it may be directed to the tower or to the dissolving vat to enrich the solution therein. The solution within the dissolving vat, after working some time, may for purification be drained off to a vacuum reservoir wherein it is heated, the vapor given off being conveyed to the tower as also is the remaining solution, after treatment for the precipitation of any iron it contains. Residue at the bottom of the dissolving vat is removed by sludge doors and treated for the recovery of the metals it contains.

Referring to the drawings which form a part of this specification:—The figure shows diagrammatically a chemical hydro-chloric (H.Cl) generator and tower, a regenerator, a sulfureted hydrogen ($H_2S$) gasometer, an auxiliary heating chamber, a dissolving vat, an electrical deposition tank, a vacuum reservoir, vessels for washing the residue from the vat, a chlorin gasometer, a chlorin generator for supplying demands of the regenerator and gasometer, and pipes, filters, traps and other details assisting in operations.

On referring to the drawings it will be seen that a hydro-chloric (H.Cl) generator is provided consisting preferably of a closed air tight pan 2 containing common salt and sulfuric acid heated in the usual manner. By a pipe 3 the hydro-chloric (H.Cl) gas is conducted to a tower 4 having above its closed top a vessel 5 below and in communication with which and within the tower is a spray 6. Within the tower 4 below the spray 6 is a suitable filtering medium 7. From the bottom of the tower leads a vat charging pipe 8 upon which is a controlling cock 9 and formed in which is a heating coil or the like 10 inclosed within an auxiliary heating chamber 11. At or near the bottom of the heating chamber is a waste gas inlet pipe 12 and from the top of said chamber leads an exit pipe 13. Exhaust gases from a gas or like engine, hereinafter mentioned, are preferably used as a heating agent for the chamber by passing through the same, but any other means preferred may be employed.

In communication with the tower 4, by the pipe 8, is a dissolving vat consisting of a shell 14 having in its top 15 ore inlets provided with gas tight covers 16. These are water luted. At or near the bottom of the shell 14 may be a false bottom of any ordinary nature removable in any well known way. Any suitable filtering medium may also be provided. At the bottom of the shell 14 are residue discharge doors 17 of any desirable character and passing residue from the vat to washing vessels hereinafter described. From the bottom of the shell leads a drain pipe 18 communicating with a reservoir hereinafter described. At or near the top of the shell is an acid inlet pipe 19.

Passing into the vat, and suspended therein by a collar 20 or in any other well known way, is a vertical spindle 21 rotated by bevel gear 22 and having at its lower end agitators 23 of any suitable nature.

Extending diametrically across the shell 14 of the vat is a heating pipe 24 through which passes hot water or steam to assist in raising the temperature in said vat. Penetrating into the shell of the vat at one side of the same is a steam inlet pipe 25 controlled by a cock 26 and injecting superheated steam into said vat to heat and assist the circulation of the contents thereof. More than one vat may be used, as will be hereinafter understood, all being similar in construction.

Passing from one side of the shell 14 is a solution pipe 27 having a controlling cock 28 thereon. Passing from the bottom of the shell is a by-pass pipe 29 having a controlling cock 30 thereon and joining the said solution pipe. Beyond the juncture of the by-pass pipe 29 with the solution pipe 27 is a circulating pump 31, operated by any known means, beyond which pump is a branch pipe 32, controlled by a cock 33. This branch pipe conveys solution from any further tank which may be used. Interposed in the solution pipe past the branch pipe is a controlling cock 34 beyond which is a filter 35 of any desirable kind. From the filter 35 the solution is conveyed by the pipe 27 to a suitable trap 36 communicating with which is a chlorin (Cl) gas inlet pipe 37. From the solution pipe, between the filter 35 and trap 36 passes a branch pipe 38 having a controlling cock 39 thereon. From the trap 36 the solution is conveyed by the pipe 27 to a filter 40 of any desired kind.

Passing through the filter 40 the solution, by the pipe 27, reaches an electrolytic antimony deposition tank consisting of a shell 41 having a cover 42 and provided with positive and preferably antimony negative electrodes 43. These consist of a series of alternate plates (negative and positive) proceeding from side to side of the tank and arranged to permit of the solution passing sinuously through the tank. Each alternate plate has an opening cut in its top of sufficient depth to allow for accumulation of gases which may pass to the outlet side of the tank in any well known way. At the bottom of the tank is a sludge door 44 of any preferred description.

Interposed in the solution pipe 27, past the deposition tank, is a controlling cock 45 beyond which is a pump 46 operated in any known way. From the pump 46 the solution is conveyed, by the pipe 27, to a suitable trap 49 provided with a sludge receptacle 50. Communicating with the trap 49 is a hydrogen sulfid ($H_2S$) inlet pipe 51. From the trap 49 the pipe 27 proceeds to the vessel 5 above the tower 4.

From the electrical deposition tank proceeds a chlorin (Cl) pipe 52 conveying the chlorin gas liberated from the solution in the said tank to a regenerator. Upon the pipe 52 is a controlling cock 53. Communicating with the pipe 52 is a pipe 54 having thereon a controlling cock 55 and supplying an extraneous supply of chlorin from an electrolytic chlorin generator 56 of any ordinary character.

The regenerator consists of a shell 57 partly filled with water and provided with a water spray 58 at its top. The shell is preferably water jacketed to keep down the temperature. Entering the regenerator is also a chlorin gas supply pipe 59 and an escape pipe 60 for superfluous gases. This latter is provided with a suitable safety valve.

Communicating with the pipe 52 between the cock 53 and the regenerator is a branch pipe 97. Interposed in the pipe 52 between said branch pipe and the regenerator is a cock 98. Controlling the branch pipe is a cock 99. Communicating with the branch pipe is a suitable water cooled vessel or trap 100 from which proceeds an acid overflow pipe 101 controlled by a cock 102 and communicating with the shell 41 of the deposition tank. In the trap 100 may be arranged a series of baffle plates to facilitate the collection of moisture from the gas. From the trap 100 proceeds a pipe 103 communicating with a gasometer 104 of any suitable character. Communicating with the gasometer is a pipe 105 controlled by a cock 106 and communicating with the chlorin generator 56. Proceeding from the gasometer is a pipe 107 communicating with a pump 108 operated by any known means. Communicating with the pump is the gas supply pipe 59 controlled by a cock 109.

Proceeding from the top of the shell 14 of the vat and entering the regenerator is a sulfureted hydrogen ($H_2S$) gas pipe 61 upon which is a controlling cock 62. From the pipe 61 extends a branch pipe 63 controlled by a cock 64. When more than one vat is used each of the sulfureted hydrogen ($H_2S$) gas pipes $61^a$ and $61^b$ from the additional vats communicates with the branch pipe 63. From the said branch pipe 63, between the cock 64 and the gas pipe 61 for the first adjacent additional vat, proceeds a pipe 78 controlled by a cock 79 and leading to any sulfuric acid ($H_2SO_4$) works.

Interposed in the pipe 61 between the branch pipe 63 and the regenerator is a controlling cock 65 between which and said regenerator is a gas strainer 66 of any suitable character.

Communicating with the pipe 61 between the gas strainer 66 and the regenerator 57 is a branch pipe 110 controlled by a cock 111. Communicating with the branch pipe is a suitable water cooled vessel or trap 112 with which communicates the pipe 19 connecting tank 14. Controlling the pipe 19 is a cock 113. In the trap may be arranged a series of baffle plates to facilitate the collection of moisture from the gas. From the trap 112 proceeds a pipe 114 communicating with a gasometer 115 of any suitable character. Proceeding from the gasometer is a pipe 116 communicating with a pump 117 operated by any known means. Proceeding from the pump is a pipe 118 controlled by a cock 119 and communicating with the pipe 61 between the branch pipe 110 and the regenerator. Interposed in the pipe 61 between the pipes 110 and 118 is a cock 120. Or the pipe 118 may communicate with the regenerator direct.

At the bottom of the regenerator are sludge doors 96. From the bottom of the regenerator passes a down pipe 67 having a controlling cock 68 and joining the charging pipe 8. Above the down pipe 67, in the regenerator, may be a suitable filtering medium. From the down pipe 67, between the bottom of the regenerator and the cock 68 on said pipe, extends an aqueous acid pipe 69 provided with a controlling cock 70 and communicating with the vessel 5 above the tower 4.

Penetrating the shell of the regenerator, at or near the top of the same, is a hydrochloric (H.Cl) gas or vapor pipe 71 communicating with a trap 72. From the trap the gas is forced by a fan or the like 73, through a pipe 74, provided with a cock 75 into the bottom of the tower 4. From the pipe 74 extends a branch pipe 76 provided with a controlling cock 77 and communicating with the dissolving vat.

Below each or any one of the residue discharge doors 17 of the vat 14, is a gutter 80 leading to an upper washing vessel 81. This is provided with a draw off pipe 82 and has at its bottom a sludge door 83. Adjacent to the sludge door is a drain pipe 84. Below the upper vessel and the sludge door and drain pipe thereof, is a lower vessel 85 having a sludge door 86 and a drain pipe 87. Each of the vessels has suitably arranged therein a filtering medium of any preferred kind.

Communicating with the drain pipe 18 of the dissolving vat 14 is a reservoir 88. From the reservoir proceeds a pipe 89 communicating with the bottom of the tower 4. Interposed in said pipe 89 is a vacuum pump 90 operated in any well known manner. Passing into said reservoir is an air inlet pipe 91 controlled by a cock 92. From said reservoir and communicating with the vessel 5 above the tower 4 leads a pipe 93 controlled by a cock 94. At the bottom of the reservoir is a sludge door 95. Within the reservoir may be arranged any suitable filtering medium.

The cycle of operations is as follows: The pulverized ore is first admitted to the dissolving vat after which the hydro-chloric acid (H.Cl) is admitted, slowly at first so as not to generate too much sulfureted hydrogen gas. Both are maintained in an agitated state by the agitators 23 and retained in a heated condition either by the heating pipe 24, or the superheated steam injected through the pipe 25, or both. The superheated steam assists in the circulation of the pulp and does not prejudicially dilute the acid solution. The heating chamber 11 has in the first instance heated the acid on its way to the vat. The action of the heat assists the saturation of the solution with antimony from the ore leaving behind a residue of gangue and gold which is unaffected by the solution.

The liquid charged with antimony, by opening the cock 28, is drawn through the valve box of the pump 31 and flows through the solution pipe 27 and filter 35 to the trap 36. Continually passing into the trap 36 by the inlet pipe 37 is a stream of chlorin (Cl) gas for the purpose of decomposing any hydrogen sulfid ($H_2S$) that may be held by the solution. Passing from the trap 36 through the filter 40 the solution enters the antimony deposition tank freed of its mechanical impurities. The tank contains plates of carbon and antimony or other suitable electrodes which are in circuit with a dynamo driven by a gas or like engine, the exhaust gases of which pass through the heating chamber 11. The alternate plates (negative and positive) within the tank electrolyze the liquid as it passes therethrough. Owing to electrolysis the antimony contained in the solution is deposited on the cathodes thus freeing the solution of most of its metal.

The acid solution taking a sinuous course through the tank is pumped, through the valve box of the pump 46, from the deposition tank to the trap 49. Passing into the trap 49 by the inlet pipe 51 is a stream of hydrogen sulfid ($H_2S$) gas which combines with any dissolved chlorin (Cl) forming hydro-chloric (H.Cl) and precipitating the sulfur. The solution then passes to the vessel 5 above the tower 4 where it is restrengthened, passed through the heating coil and chamber, and used again in the dissolving vat.

The sulfureted hydrogen gas (H₂S) generated in the dissolving vat, by opening the cock 62 is admitted through the pipe 61 into the regenerator. The chlorin gas liberated from the solution in the deposition tank, by operating the cock 53 enters the regenerator through the pipe 52. The amount of chlorin (Cl) generated within the deposition tank may not be chemically equivalent to the amount of sulfureted hydrogen (H₂S) liberated from the dissolving vat. The extraneous source of chlorin from the electrolytic generator 56, however, keeps the balance of the regenerator. Or instead of directing the chlorin gas from the tank shell 41 to the regenerator, by closing the cock 98 it may be directed to the trap 100 and by the pipe 103 to the gasometer 104, being pumped as desired by the pump 108 to the regenerator by the pipe 59. Any additional supply of chlorin may be obtained from the generator 56 by manipulating the cocks 55 and 106. Any overflow of condensed acid from the trap 100 may be conveyed back to the tank shell 14 by the pipe 101. And instead of directing the sulfureted hydrogen (H₂S) gas from the vat 14 to the regenerator by closing the cock 120 it may be directed to the trap 112 and by the pipe 114 to the gasometer 115 being pumped as desired by the pump 117 to the regenerator by the pipe 118. Any overflow of condensed acid from the trap 112 may be conveyed back to the vat by the pipe 19. The pumps 108 and 117 are so regulated in capacity that the gas each forces into the regenerator is in the necessary proportion to satisfy the chemical equation

$$H_2S + Cl_2 = 2HCl + S.$$

By the water spray 58 the gases within the regenerator are mixed and condensed forming hydro-chloric (H.Cl) acid and free sulfur. Any uncombined sulfureted hydrogen may be led to sulfuric acid works and there made into sulfuric acid (H₂S.O₄). The cocks 64 and 79 upon the pipe 63 and 78 admit of this procedure. The aqueous acid within the regenerator may be, by opening the cock 68, led through the heating coil 10 to the dissolving vat or by closing the cock 68 and opening the cock 70 it may be led to the vessel 5 above the tower 4 to be strengthened. The hydro-chloric (H.Cl) gas or vapor within the regenerator is drawn by the fan through the pipe 71 into the trap 72 where it is freed of any precipitated sulfur and thence forced into the bottom of the tower 4. Or by manipulating the cock 75 and opening the cock 77 the gas may be directed to the dissolving vat to enrich the acid solution acting upon the ore therein.

The residue at the bottom of the dissolving vat (consisting of gangue, gold and other valuable metals) is removed by the sludge doors 17 and may be treated in any well known manner for the recovery of the metals, the preferred treatment being by washing in the vessels 81 and 85 with a solution of common salt or weak hydro-chloric acid or both, then filtering, and washing down with hot water, the resulting residue being either chlorinated or otherwise treated.

After working some time the solution within the dissolving vat may be drained off by the pipe 18 to the reservoir 88. By operating the pump 90 a vacuum is formed within said reservoir above the solution. The solution is then by any suitable heating means, boiled or heated causing steam and hydro-chloric vapor to be given off which are led away to the tower 4 by the pipe 89 and then condensed. The spent solution then has air driven through it by the air inlet pipe 91 which precipitates the iron (Fe) contained therein in the form of ferric oxid. The solution may then be filtered from the said ferric oxid through the pipe 93 and passed down the tower 4. Or the vacuum may be applied to the vat direct and the solution boiled therein, the vapors being delivered to the bottom of the tower through the pipe 19 and the solution then being passed into the reservoir 88 for further treatment as described.

Having now described our invention, what we claim as new and desire to secure by Letters Patent is:—

1. The process of treating gold-bearing antimony ores, which consists in subjecting the pulverized ore to the action of hydrochloric acid while being heated and agitated, purifying the solution and electrodepositing antimony therefrom, eliminating free chlorin from the spent electrolyte, and utilizing the solution for the treatment of further bodies of ore.

2. Improvements relating to the treatment of gold bearing antimony ores, which consist in generating hydro-chloric (H.Cl) acid and passing it through a tower to a dissolving vat, heating the hydro-chloric acid in its passage from the tower to the vat, heating and agitating the ore and acid within the vat, filtering the surcharged solution in its passage from the vat and decomposing hydrogen sulfid (H₂S) held therein, treating the solution electrolytically within a deposition tank for the recovery of its antimony, passing the solution from the tank back to the tower for strengthening and re-use, mixing and condensing in a regenerator the gases arising during treatment, maintaining their chemical equivalence and utilizing them in further treatment of the ore, substantially as set forth.

3. In improvements relating to the treatment of gold bearing antimony ores, which consist in generating hydro-chloric (H.Cl) acid and passing it through a tower to a dissolving vat, heating and agitating the ore and acid within the vat, filtering the surcharged solution in its passage from the vat, treating the solution electrolytically within an antimony deposition tank, passing the solution freed of its antimony back to the tower for strengthening and re-use, passing chlorin gas arising in the antimony deposition tank through a condensing trap to a gasometer, passing the sulfureted hydrogen gas arising in the dissolving vat through a condensing trap to a gasometer, passing said gases from said gasometers to a regenerator in proper chemical proportions, utilizing hydro-chloric acid (H.Cl) formed by the mixing of the gases in the regenerator in the further treatment of the ore, substantially as set forth.

4. In improvements relating to the treatment of gold bearing antimony ores, generating hydro-chloric acid and subjecting pulverized ore to the action of said acid, applying heat and maintaining an agitation during the treatment of the ore by said acid, treating the surcharged solution after treatment by the acid electrolytically for the recovery of its antimony, employing the gases given off and the solution used during treatment for further treatment by returning them in a state of chemical equivalence to the source of generation, purifying the solution when requisite after working by heating the same and forcing air therethrough, strengthening the said purified solution and vapor given off from the same by returning to the source of generation, treating the residue of the ore for the recovery of its precious constituents.

5. Improvements relating to the treatment of gold bearing antimony ores, which consist in generating hydro-chloric (H.Cl) acid and passing the same through a tower to a dissolving vat, heating said acid in its passage to said vat, subjecting pulverized ore to the action of said acid within said vat, heating and agitating said ore and acid within said vat, passing the surcharged solution from said vat to an electrolytic deposition tank for the depositing of its antimony, freeing said solution of its mechanical impurities in said passage, passing said solution from said tank to said tower for re-use, mixing and condensing the gases arising in the dissolving vat and the deposition tank within a regenerator, maintaining the chemical equivalence of said gases by utilizing a chlorin generator, utilizing the hydro-chloric acid formed in the regenerator in the further use of the ore, purifying solution within the dissolving vat by draining into a reservoir, applying a vacuum to said reservoir, heating the solution within said reservoir, forcing air through said solution, returning the vapor given off said solution and the solution after such treatment to the tower for re-use, substantially as set forth.

6. In improvements relating to the treatment of gold bearing antimony ores, in combination, a hydro-chloric acid generator communicating with a tower having a spray therein, a pipe leading from said tower, means for heating the hydro-chloric acid as it passes through said pipe, a dissolving vat in communication with said tower by said pipe, agitating means within said vat, means for heating the contents of said vat, a filter in communication with said vat, a trap in communication with said filter, a chlorin gas inlet pipe entering said trap, a filter communicating with said trap, an electrical deposition tank in communication with said filter, a trap in communication with said tank, a hydrogen sulfid ($H_2S$) inlet pipe entering said trap, aforesaid tower and trap being in communication, substantially as hereinbefore described and illustrated in the annexed drawings.

7. In improvements relating to the treatment of gold bearing antimony ores, in combination, a hydro-chloric acid generator communicating with a tower having a spray therein, a pipe leading from said tower, means for heating the hydro-chloric acid as it passes through said pipe, a dissolving vat in communication with said tower by said pipe, agitating means within said vat, means for heating the contents of said vat, a filter in communication with said vat, a trap in communication with said filter, a chlorin gas inlet pipe entering said trap, a filter communicating with said trap, an electrical deposition tank in communication with said filter, a trap in communication with said tank, a hydrogen sulfid ($H_2S$) inlet pipe entering said trap, aforesaid tower and trap being in communication, a regenerator in communication with aforesaid dissolving vat, deposition tank, and tower, a water spray within said regenerator, a chlorin generator in communication with said regenerator, a gas strainer interposed between said regenerator and dissolving vat, a trap to free precipitated sulfur interposed between said regenerator and tower, said regenerator communicating both its gaseous and aqueous acid optionally to the tower or to the vat.

8. In improvements relating to the treatment of gold bearing antimony ores, in combination, a hydro-chloric acid generator communicating with a tower having a spray therein, a pipe leading from said tower, means for heating the hydro-chloric acid as it passes through said pipe, a dissolving vat in communication with said tower by said pipe, agitating means within said vat, means for heating the contents of said vat, a filter in communication with said vat, a trap in communication with said filter, a chlorin gas inlet pipe entering said trap, a filter communicating with said trap, an electrical deposition tank in communication with said filter, a trap in communication with said tank, a hydrogen sulfid ($H_2S$) inlet pipe entering said trap, aforesaid tower and trap being in communication, a regenerator in communication with aforesaid dissolving vat, deposition tank, and tower, a water spray within said regenerator, a chlorin generator in communication with said regenerator, a gas strainer interposed between said regenerator and dissolving vat, a trap to free precipitated sulfur interposed between said regenerator and tower, said regenerator communicating both its gaseous and aqueous acid optionally to the tower or to the vat, a reservoir in communication with the vat, a vacuum pump communication with said reservoir, an air inlet pipe entering said reservoir, a gas pipe connecting said reservoir to the bottom of the tower, a solution pipe connecting said reservoir with the top of said tower, washing vessels in communication with the bottom of said vat.

9. In improvements relating to the treatment of gold bearing antimony ores, in combination, a hydro-chloric acid generator communicating with a tower having a spray therein, a pipe leading from said tower, means for heating the hydro-chloric acid as it passes through said pipe, a dissolving vat in communication with said tower by said pipe, agitating means within said vat, means for heating the contents of said vat, a filter in communication with said vat, a trap in communication with said filter, a chlorin gas inlet pipe entering said trap, a filter communicating with said trap, an electrical deposition tank in communication with said filter, a trap in communication with said tank, a hydrogen sulfid ($H_2S$) inlet pipe entering said trap, aforesaid tower and trap being in communication, a chlorin pipe leading from said tank, a trap communicating with said pipe, a gasometer communicating with said trap, a pump communicating with said gasometer, a regenerator communicating with said pump, a chlorin generator in communication with said gasometer, a sulfureted hydrogen gas pipe leading from said dissolving vat, a trap communicating with said pipe, a gasometer communicating with said trap, a pump communicating with said gasometer, said pump communicating with said regenerator, means for directing gaseous and aqueous acid formed in said generator to said tower and said dissolving vat.

In testimony whereof we affix our signatures in the presence of two subscribing witnesses.

JOHN JONES.
HORACE SANDFORD BOHM.

Witnesses:
ROBERT GAMBLE BROWN,
FREDERICK CRAWFORD.